United States Patent
Fukutomi

(10) Patent No.: US 11,488,291 B2
(45) Date of Patent: Nov. 1, 2022

(54) IMAGE PROCESSING APPARATUS FOR GENERATING A COMBINED IMAGE FROM PLURAL CAPTURED IMAGES HAVING BEEN SUBJECTED TO POSITION ALIGNMENT, AND IMAGE PROCESSING METHOD

(71) Applicant: OLYMPUS CORPORATION, Hachioji (JP)

(72) Inventor: Takeshi Fukutomi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 117 days.

(21) Appl. No.: 17/089,916

(22) Filed: Nov. 5, 2020

(65) Prior Publication Data
US 2021/0056671 A1   Feb. 25, 2021

Related U.S. Application Data

(63) Continuation of application No. PCT/JP2018/022384, filed on Jun. 12, 2018.

(51) Int. Cl.
G06T 5/00 (2006.01)
G06T 5/50 (2006.01)
(Continued)

(52) U.S. Cl.
CPC ............ G06T 5/50 (2013.01); G06T 7/11 (2017.01); G06T 7/215 (2017.01); *G06T 2207/20021* (2013.01); *G06T 2207/20221* (2013.01)

(58) Field of Classification Search
CPC ... G06T 2207/10016; G06T 5/50; G06T 7/11; G06T 2207/20021; G06T 2207/20221;
(Continued)

(56) References Cited

U.S. PATENT DOCUMENTS

2006/0244866 A1* 11/2006 Kishida ............ G06K 9/6218
348/143
2012/0162528 A1* 6/2012 Kiuchi ............ H04N 19/513
348/607
(Continued)

FOREIGN PATENT DOCUMENTS

JP  2008118555 A  5/2008
JP  2008219124 A  9/2008
(Continued)

OTHER PUBLICATIONS

International Search Report (ISR) (and English translation thereof) dated Jul. 31, 2018 issued in International Application No. PCT/JP2018/022384.

*Primary Examiner* — Li Liu
(74) *Attorney, Agent, or Firm* — Holtz, Holtz & Volek PC

(57) ABSTRACT

An image processing apparatus includes one or more processors including hardware. The one or more processors are configured to: divide, regarding a plurality of images acquired by capturing images of an imaging subject over time, the respective images into a plurality of regions; calculate, for the respective divided regions, motion vectors by detecting movements of the imaging subject; detect luminances and contrasts of the respective regions and detect specific regions where the detected luminances and contrasts satisfy determination conditions, the determination conditions being that the luminances are equal to or greater than a first threshold and that the contrasts are equal to or less than a second threshold; select the motion vectors to be used by excluding the motion vectors of the detected specific regions from the calculated motion vectors; and generate a combined image by performing position alignment of the plurality of images by using the selected motion vectors.

7 Claims, 12 Drawing Sheets

(51) Int. Cl.
*G06T 7/215* (2017.01)
*G06T 7/11* (2017.01)

(58) Field of Classification Search
CPC ......... G06T 7/215; G06T 7/33; G06K 9/6218; H04N 19/513
See application file for complete search history.

(56) References Cited

U.S. PATENT DOCUMENTS

2013/0308012 A1* 11/2013 Fukutomi ............... G06T 5/009
348/229.1
2017/0280055 A1    9/2017 Kaida

FOREIGN PATENT DOCUMENTS

| JP | 2012199858 A | 10/2012 |
| JP | 2013085140 A | 5/2013 |
| JP | 2016111568 A | 6/2016 |
| JP | 2017175364 A | 9/2017 |

* cited by examiner

IMAGE PROCESSING APPARATUS FOR GENERATING A COMBINED IMAGE FROM PLURAL CAPTURED IMAGES HAVING BEEN SUBJECTED TO POSITION ALIGNMENT, AND IMAGE PROCESSING METHOD

CROSS-REFERENCE TO RELATED APPLICATIONS

This is a continuation of International Application PCT/JP2018/022384, with an international filing date of Jun. 12, 2018, which is hereby incorporated by reference herein in its entirety.

TECHNICAL FIELD

The present invention relates to an image processing apparatus and an image processing method.

BACKGROUND ART

There is a known image processing apparatus that combines a plurality of images acquired by capturing images of an imaging subject over time (for example, see Patent Literature 1).

Regions in which tones thereof cannot be reproduced, which are referred to as blown out highlights, sometimes occur in images captured in an overexposed state. In the case in which a plurality of images are combined, an erroneous determination may result from detecting position displacements among the images including the regions in which blown out highlights occur; therefore, such regions are excluded from targets for detecting position displacement.

In Patent Literature 1, in the case in which pixel values are greater than a prescribed threshold, it is determined that blown out highlights occur in those pixels, and said pixels are excluded from the targets for detecting position displacement.

CITATION LIST

Patent Literature

{PTL 1} Japanese Unexamined Patent Application, Publication No. 2008-118555

SUMMARY OF INVENTION

An aspect of the present invention is directed to an image processing apparatus including one or more processors comprising hardware, the one or more processors being configured to: divide, regarding a plurality of images acquired by capturing images of an imaging subject over time, the respective images into a plurality of regions; calculate, for the respective regions divided by the region dividing portion, motion vectors by detecting movements of the imaging subject; detect luminances and contrasts of the respective regions and detect specific regions in which the detected luminances and contrasts satisfy determination conditions, the determination conditions being that the luminances are equal to or greater than a first threshold and that the contrasts are equal to or less than a second threshold; select the motion vectors to be used by excluding the motion vectors of the specific regions detected by the specific-region detecting portion from the motion vectors calculated by the motion-vector calculating portion; and generate a combined image by performing position alignment of the plurality of images by using the motion vectors selected by the vector selecting portion.

Another aspect of the present invention is directed to an image processing method including: dividing, regarding a plurality of images acquired by capturing images of an imaging subject over time, the respective images into a plurality of regions; calculating motion vectors by detecting, for the respective divided regions, movements of the imaging subject; detecting luminances and contrasts of the respective regions; detecting specific regions in which the detected luminances and contrasts satisfy determination conditions, the determination conditions being that the luminances are equal to or greater than a first threshold and that the contrasts are equal to or less than a second threshold; selecting the motion vectors to be used by excluding the motion vectors of the specific regions from the calculated motion vectors; and generating a combined image by performing position alignment of the plurality of images by using the selected motion vectors.

DESCRIPTION OF EMBODIMENT

An image processing apparatus 1 and an image processing method according to an embodiment of the present invention will be described below with reference to the drawings.

Figure 1:
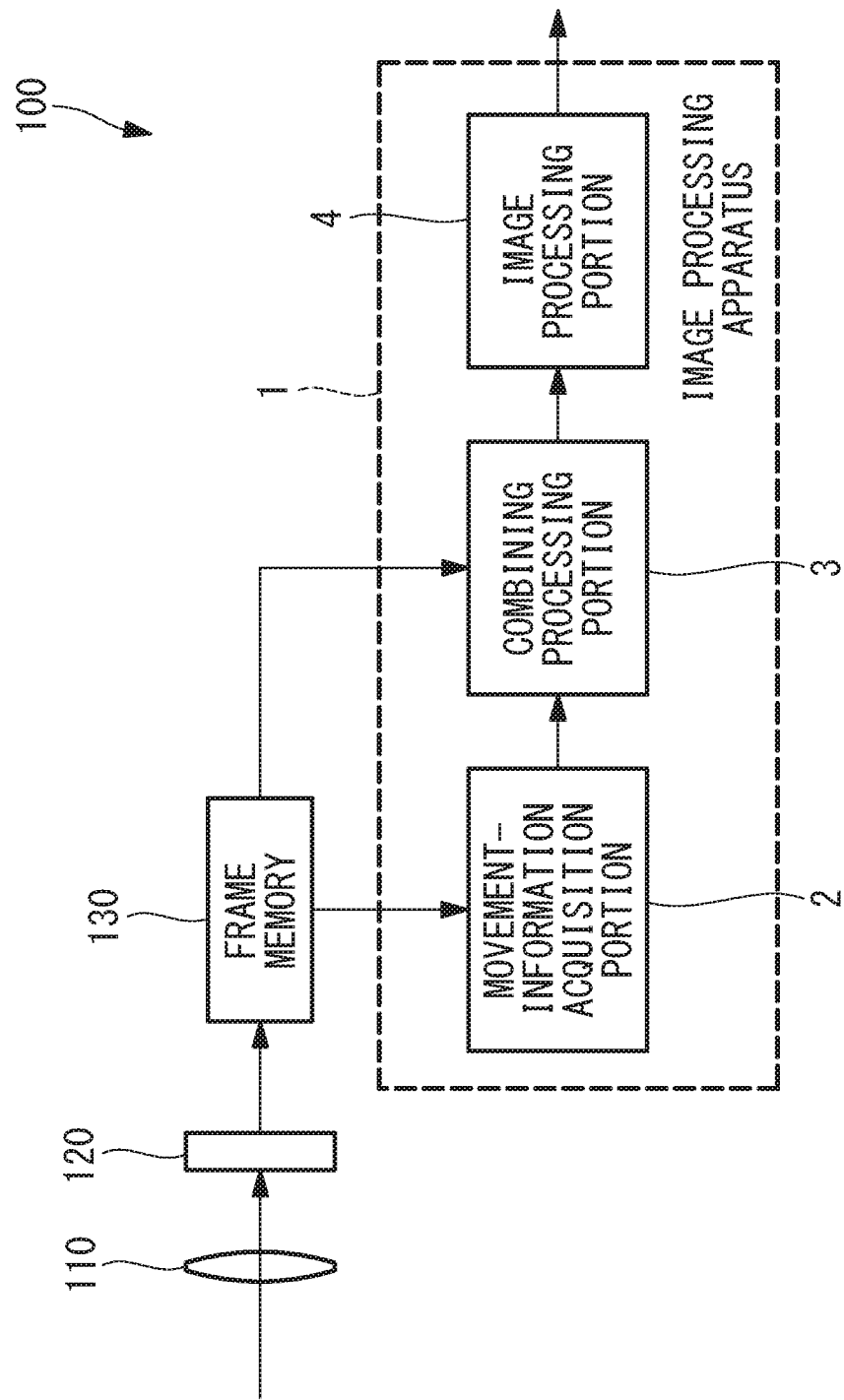
FIG. 1 is an overall configuration diagram showing an image processing apparatus according to an embodiment of the present invention.
Figure 2:
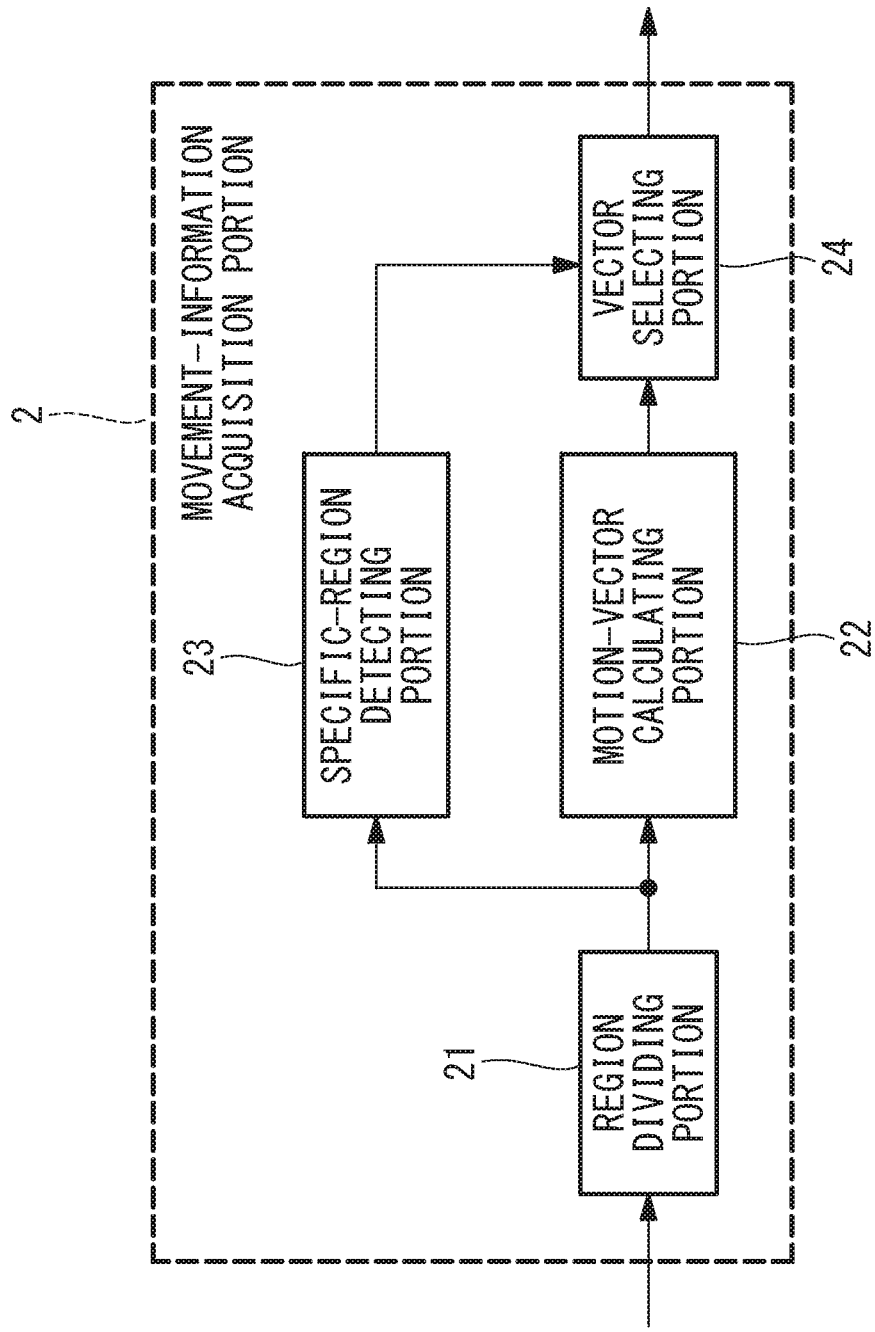
FIG. 2 is a block diagram showing a movement-information acquisition portion included in the image processing apparatus in FIG. 1.

As shown in FIG. 1, the image processing apparatus 1 according to this embodiment is included in a camera 100.

The camera 100 includes: a lens 110 that focuses light coming from an imaging subject; an image acquisition device 120 that captures the light focused by the lens 110; a frame memory 130 that sequentially stores the images acquired by the image acquisition device 120; and the image processing apparatus 1 that processes the images stored in the frame memory 130.

The image processing apparatus 1 includes: a movement-information acquisition portion 2 that acquires movement information from the plurality of images stored in the frame memory 130; a combining processing portion 3 that performs position alignment of the plurality of images stored in the frame memory 130 by using the acquired movement information and that subsequently combines the images; and an image processing portion 4 that outputs the combined image after applying necessary image processing, such as color processing and tone conversion processing, to the combined image.

The movement-information acquisition portion 2 includes: a region dividing portion 21 that divides each of the plurality of images stored in the frame memory 130 into a plurality of regions; a motion-vector calculating portion 22 that calculates motion vectors by detecting a movement of the imaging subject in each of the divided regions; a specific-region detecting portion 23 that detects specific regions in the divided regions; and a vector selecting portion 24 that selects motion vectors to be used by excluding the detected specific regions from the calculated motion vectors.

Figure 3:
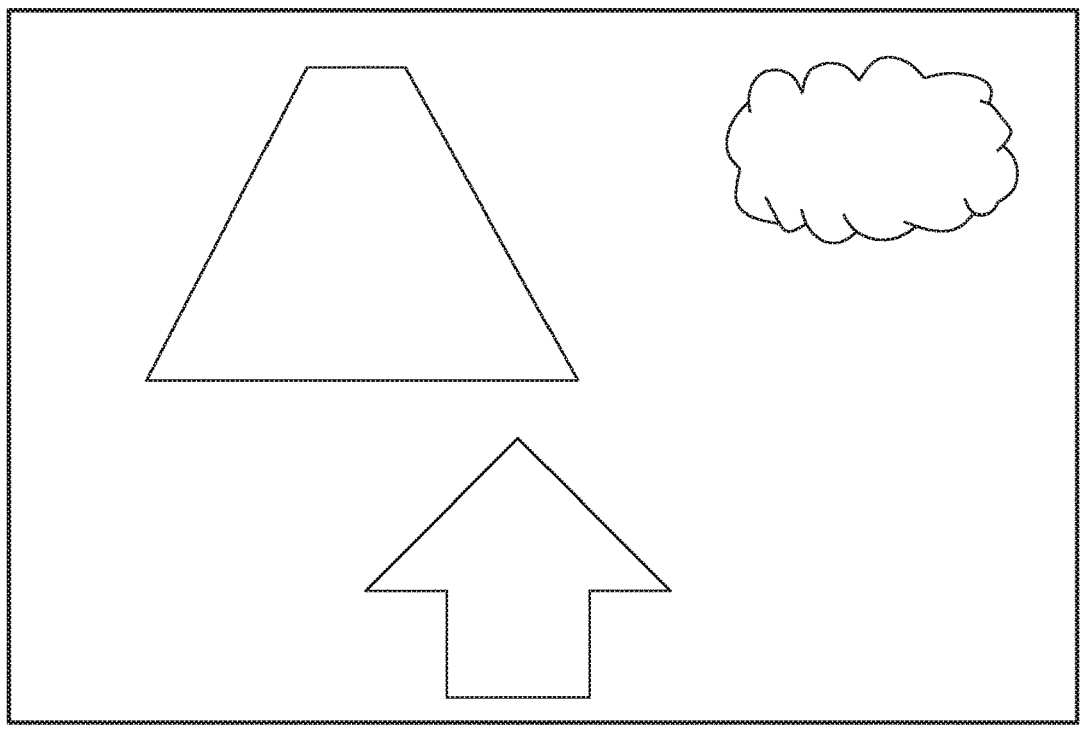
FIG. 3 is an image diagram showing a standard image selected by a region dividing portion in FIG. 2.
Figure 4:
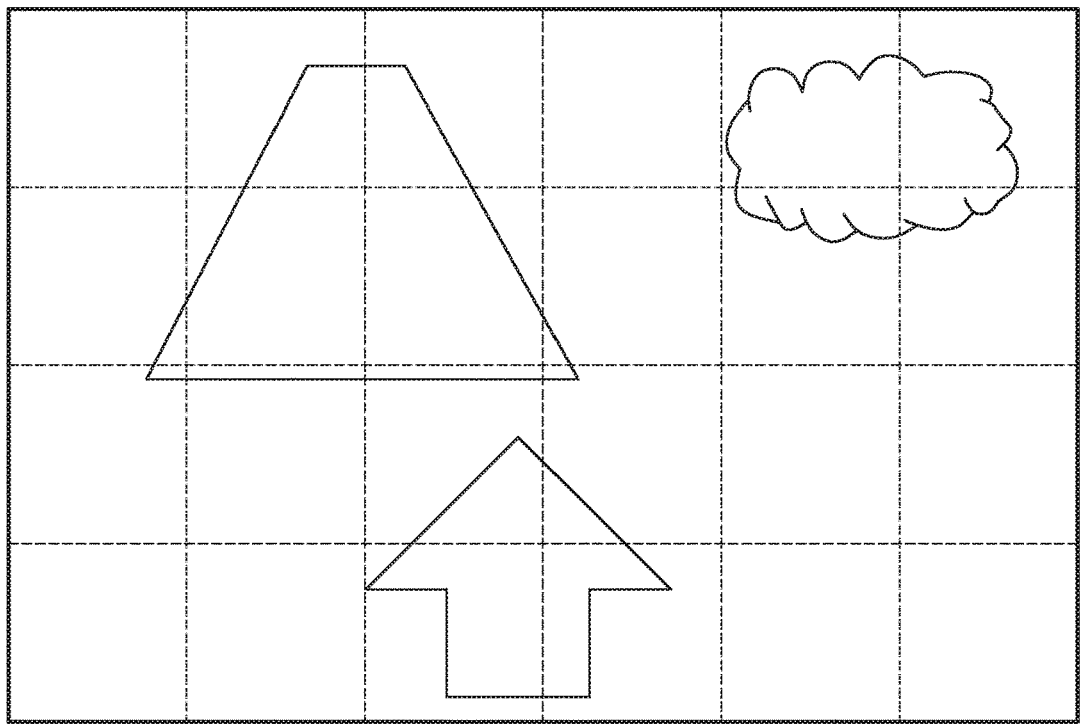
FIG. 4 is an image diagram showing a state in which the standard image in FIG. 3 is divided into a plurality of regions.

The region dividing portion 21 selects, from among the images stored in the frame memory 130, one standard image and one reference image that is acquired at a different time from the standard image for the same imaging subject. Then, as shown in FIGS. 3 and 4, the standard image and the reference image are divided into a plurality of regions by using the same method. In FIG. 4, the standard image and the reference image are divided into the same 4×6=24 square sub-regions.

Figure 5:
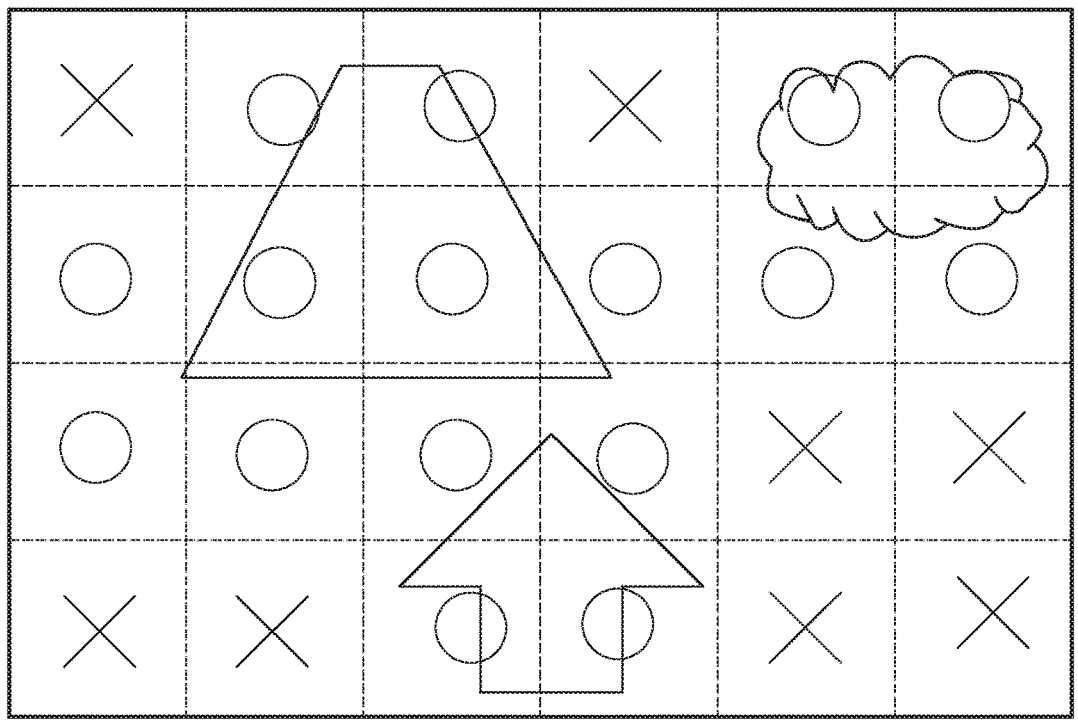
FIG. 5 is an image diagram showing a state in which degrees of reliability are assigned to the respective regions of a reference image.

The motion-vector calculating portion 22 calculates a motion vector of the reference image with respect to the standard image for each of the divided sub-regions. The motion vector has a degree of reliability that indicates the direction and the amount of position displacement and whether or not to use that motion vector for performing position alignment. In FIG. 5, "x" or "o" assigned to the individual sub-regions indicates the degrees of reliability thereof, where "x" means "not to be used" and "o" means "to be used". In the example shown in FIG. 5, "x" is assigned to sub-regions that do not have feature points in both the standard image and the reference image.

The specific-region detecting portion 23 detects a luminance and a contrast for each of the regions divided by the region dividing portion 21, determines that the regions are specific regions in the case in which the luminances and the contrasts thereof satisfy determination conditions, and determines that the regions are not specific regions in the case in which the determination conditions are not satisfied. Here, the detected luminance being equal to or greater than a first threshold and the detected contrast being equal to or less than a second threshold are set as the determination conditions.

Examples of the luminance value of each region include an average or a median value of luminance values of individual pixels in each region. The contrast value of each region is calculated by means of the following expression by using a minimum value and a maximum value of the luminance values of the individual pixels in each region:

Contrast value=(maximum value−minimum value)/
(maximum value+minimum value+$C$).

Here, $C$ is a constant for preventing the denominator from becoming zero in the above-described expression, and is set to be a sufficiently small value.

The image processing method employing the image processing apparatus 1 according to this embodiment will be described below with reference to the drawings.

When the image acquisition device 120 captures the light that has come from the imaging subject and that has been focused by means of the lens 110, the plurality of images acquired by the image acquisition device 120 over time are sequentially stored in the frame memory 130. Image processing is initiated upon transmitting, from among the plurality of images stored in the frame memory 130, two images that are adjacent to each other in the time-axis direction to the movement-information acquisition portion 2.

Figure 8:
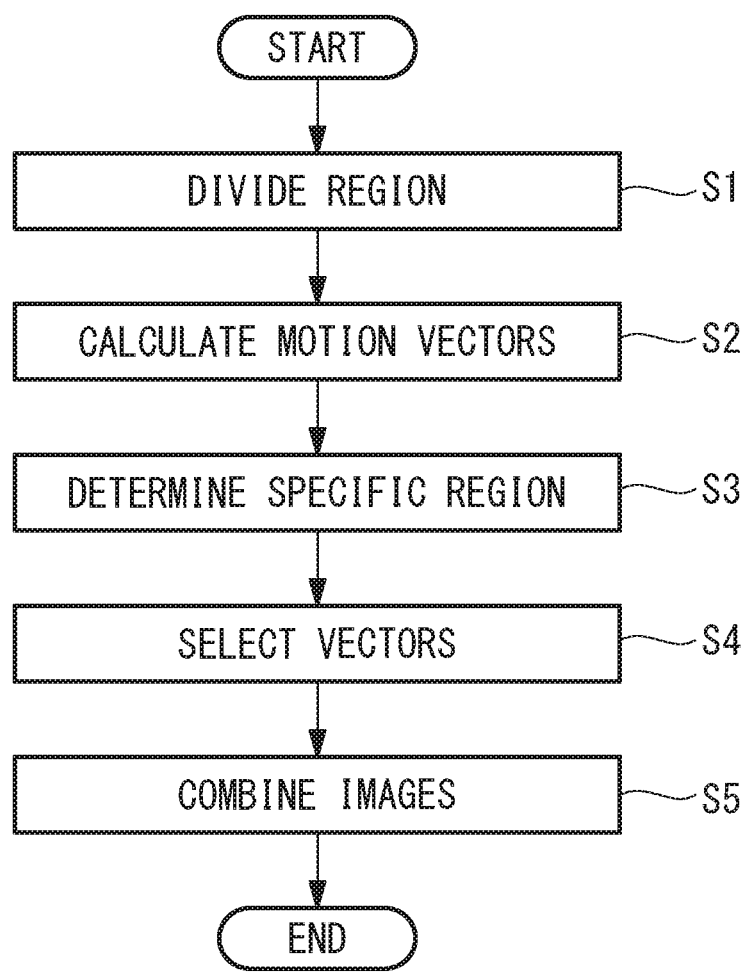
FIG. 8 is a diagram showing the flow of an image processing method employing the image processing apparatus in FIG. 1.

The image processing apparatus 1 uses one of the two images transmitted thereto from the frame memory 130 as the standard image, as shown in FIG. 4, and the other image as the reference image, as shown in FIG. 5, and the region dividing portion 21 divides the two images into the plurality of sub-regions by means of the same method, as shown in FIG. 8 (region dividing step S1).

Next, the motion-vector calculating portion 22 calculates the motion vector for each of the divided regions (motion vector calculating step S2), and the specific-region detecting portion 23 determines whether or not each of the divided regions is a specific region (specific-region determining step S3). The degrees of reliability that indicate the directions and the amounts of position displacements and whether or not to use the motion vectors in position alignment are calculated by the motion-vector calculating portion 22, as shown in FIG. 5, by means of a publicly known method, and the degrees of reliability are transmitted to the vector selecting portion 24.

Figure 6:
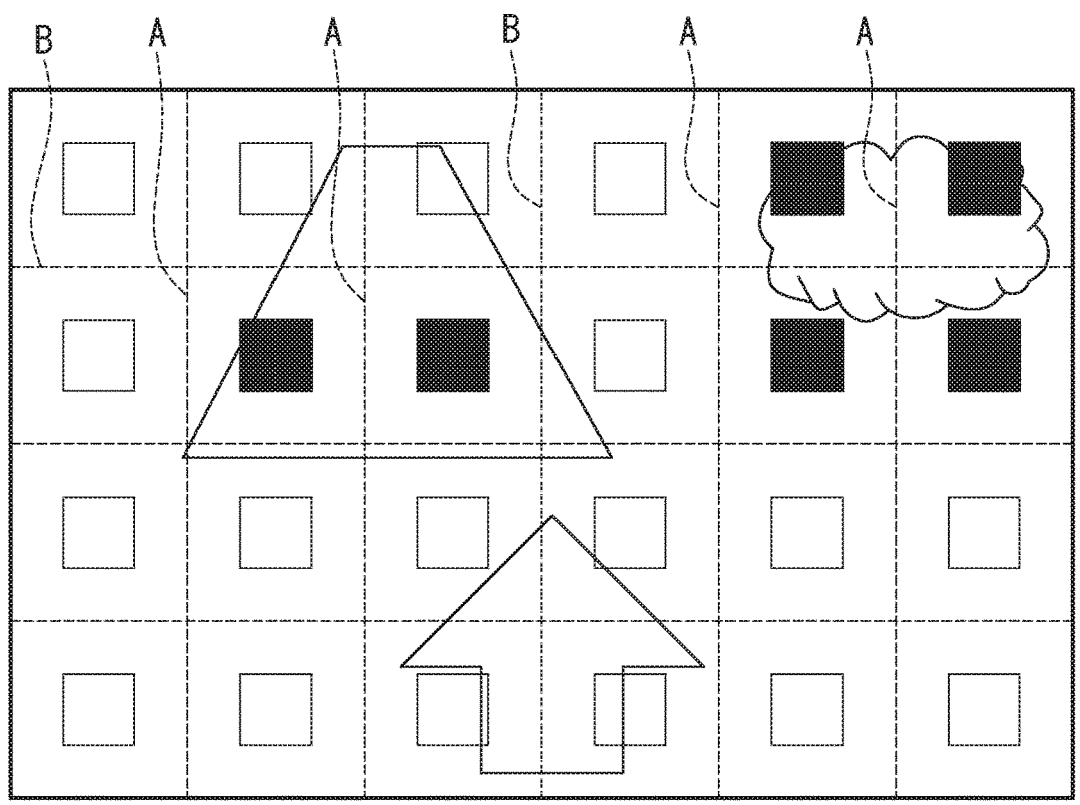
FIG. 6 is an image diagram showing a state in which the individual regions of the reference image are sorted into specific regions and non-specific regions.

The specific-region detecting portion 23 detects the luminance value and the contrast value of each of the regions, and, as shown in FIG. 6, it is determined whether or not each of the regions is a region in which the luminance value is equal to or greater than the first threshold and the contrast value is equal to or less than the second threshold, in other words, a high-luminance, low-contrast specific region. The determination results regarding whether or not each region is a specific region are transmitted to the vector selecting portion 24. In FIG. 6, filled rectangles are specific regions A, and open rectangles are non-specific regions B.

Figure 7:
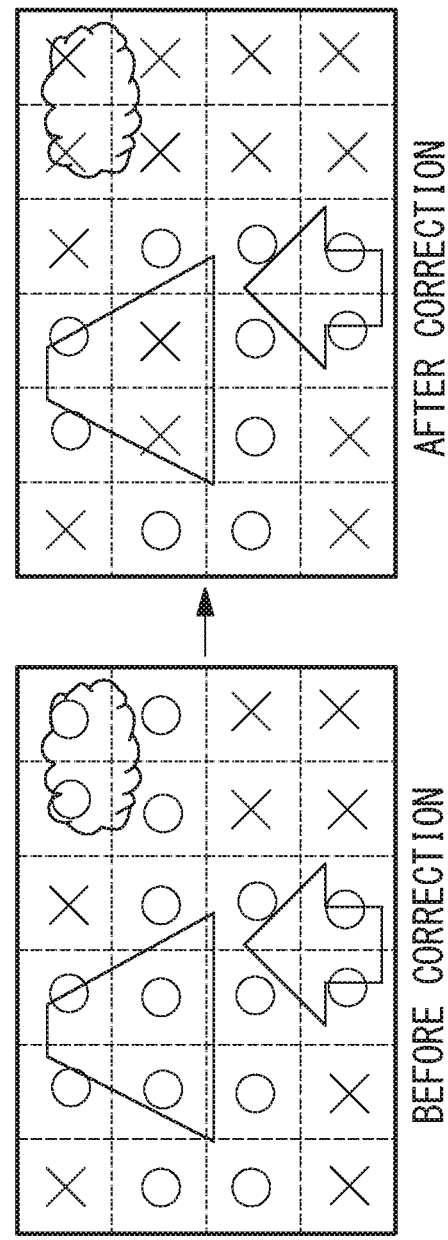
FIG. 7 is an image diagram showing a state in which a plurality of images are combined by executing position alignment between the images.

The vector selecting portion 24 selects, for the individual regions, the motion vectors to be used for performing position alignment by using the motion vectors calculated by the motion-vector calculating portion 22 and the information of the specific regions A determined by the specific-region detecting portion 23 (vector selecting step S4). Specifically, the high-luminance, low-contrast regions are set to be the specific regions A, as shown in FIG. 6, and the set specific regions A are excluded from the regions in which the motion vectors will be used, as shown in FIG. 7.

Then, position alignment between the images is performed by using the selected motion vectors, and the combining processing portion 3 combines the plurality of images (image combining step S5).

With the image processing apparatus 1 and the image processing method according to this embodiment, as a result of employing a simple configuration in which the motion vectors of the high-luminance, low-contrast regions will not be used, there is an advantage in that it is possible to perform position alignment in a precise manner by reducing the number of artifacts due to position alignment even if an imaging subject for which it is difficult to achieve matching between cloud-like frame images is present. In this case, there is an advantage in that it is possible to reduce the calculation cost by calculating the motion vectors using sub-region units instead of pixel units.

Note that, although the specific regions A are detected by using, as the only condition, that the specific regions have a high luminance and a low contrast in this embodiment, other conditions may be added.

For example, other conceivable conditions include whether or not subject regions are in the upper half of the images. In the normal case, a cloud is present in the sky, and the sky is positioned in the upper half of the images; therefore, as a result of adding said condition, it is possible to more reliably exclude, as the specific regions A, the regions including the cloud. In addition, another specific position in the images other than the upper half may be added as a condition.

Figure 9:
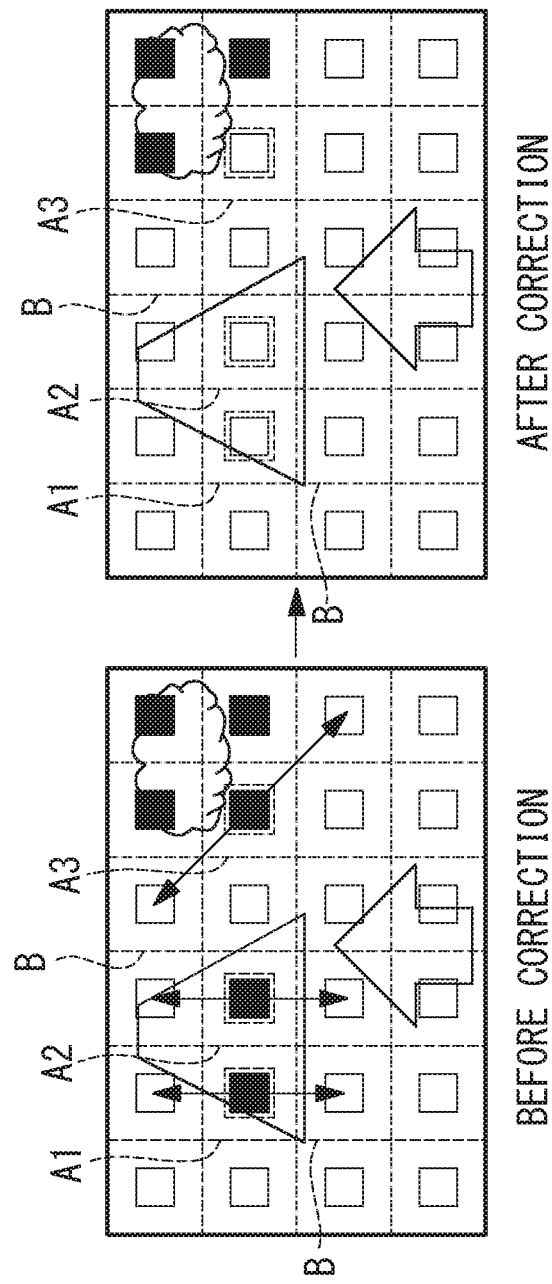
FIG. 9 is an image diagram showing a state in which the respective regions of the reference image are sorted into the specific regions and the non-specific regions, and the specific regions are re-determined.

In addition, the specific regions A are detected by using, as the only condition, that the specific regions have a high luminance and a low contrast in this embodiment; however, alternatively, the specific regions A may be re-determined from the relationship with respect to the surrounding regions after detecting the specific regions A once. For example, in the case in which the specific regions A are detected as shown in FIG. 6, a specific region A may be re-determined as being a non-specific region B in the case in which said specific region A is sandwiched by the non-specific regions B in one of the top-to-bottom, left-to-right, and diagonal directions. In the example shown in FIG. 9, two specific regions A1 and A2 are sandwiched by the non-specific regions B in the top-to-bottom direction, and, in addition, a specific region A3 is sandwiched by the non-specific regions B in the diagonal direction; therefore, the specific regions A1, A2, and A3 are replaced by the non-specific regions.

Figure 10:
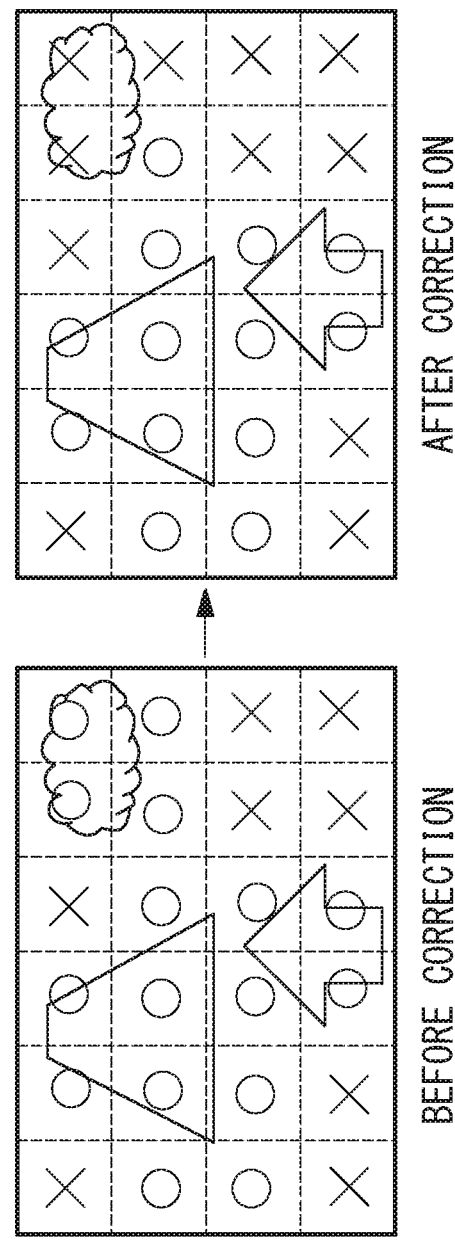
FIG. 10 is an image diagram showing a state in which the plurality of images are combined by executing position alignment between the images by using the specific regions re-determined in FIG. 9.

By doing so, the erroneous determination that the regions in which the motion vectors should be used are determined not to be used as a result of the specific region determination is corrected, as shown in FIG. 10, and thus, it is possible to perform the position alignment in a more precise manner.

Figure 11:
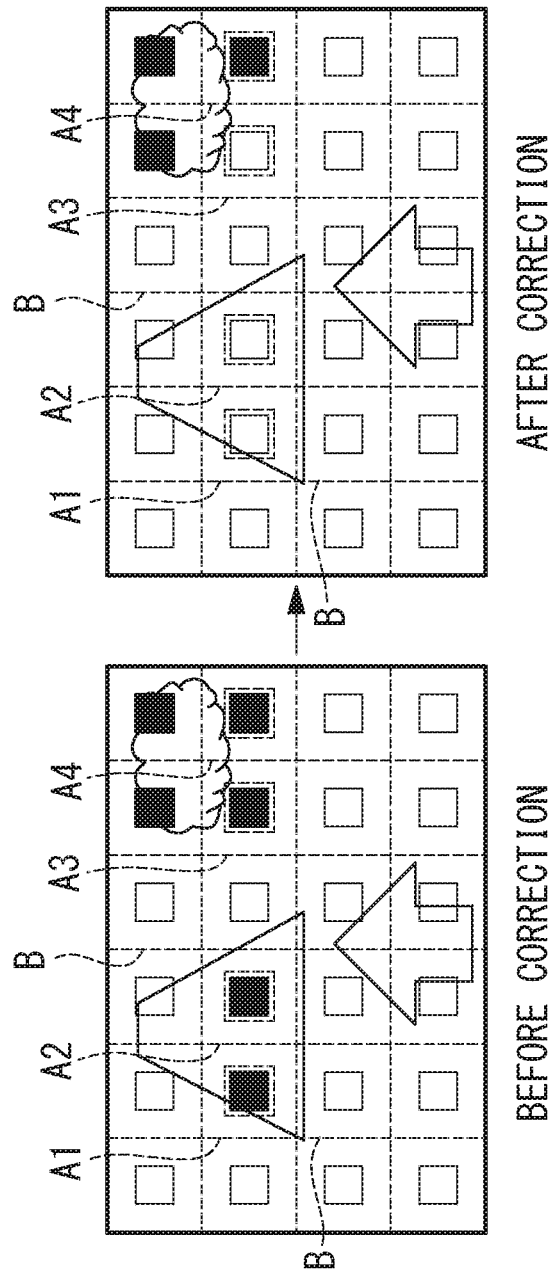
FIG. 11 is an image diagram showing a modification of FIG. 9.

In addition, instead of the case in which a specific region A is sandwiched between the non-specific regions B, in the case in which the number of the non-specific regions B is greater than the number of the specific regions A in an arbitrary region centered on a specific region A, said specific region A may be redefined as a non-specific region B. For example, the number of the specific regions A and the number of the non-specific regions B may be compared in 3×3 regions in which a specific region A is the center region. Accordingly, the specific regions A1, A2, and A3 are reset as non-specific regions, as shown in FIG. 11.

Because a specific region A4 is positioned at an edge of a screen, it is not possible to ensure a 3×3 region in the screen. Therefore, in the case in which it is not possible to ensure regions at the edge of the screen, in general, the processing is not performed, or regions in the screen are expanded outside. Methods for expanding the regions in the screen outside include a method in which the regions in the screen are copied to the outside and a method referred to as mirroring. A4 is set to be a specific region in FIG. 11 by using either of the aforementioned methods.

Figure 12:
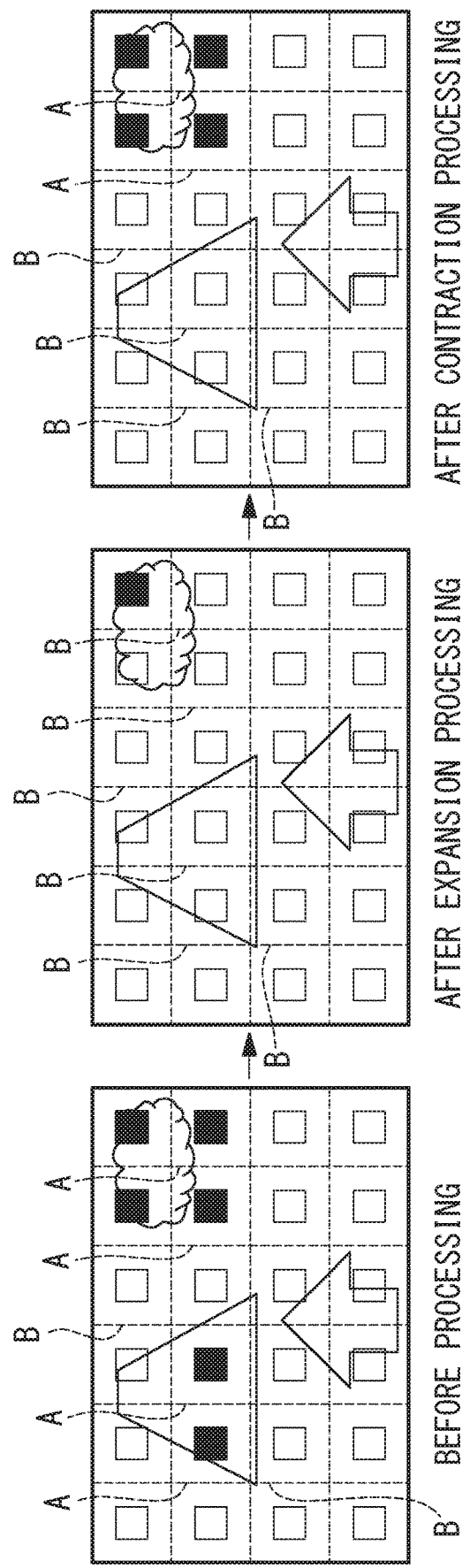
FIG. 12 is an image diagram showing another modification of FIG. 9.

In addition, as shown in FIG. 12, the specific regions A may be replaced by the non-specific regions B by performing expansion processing and contraction processing in this order regarding the non-specific regions B.

Figure 13:
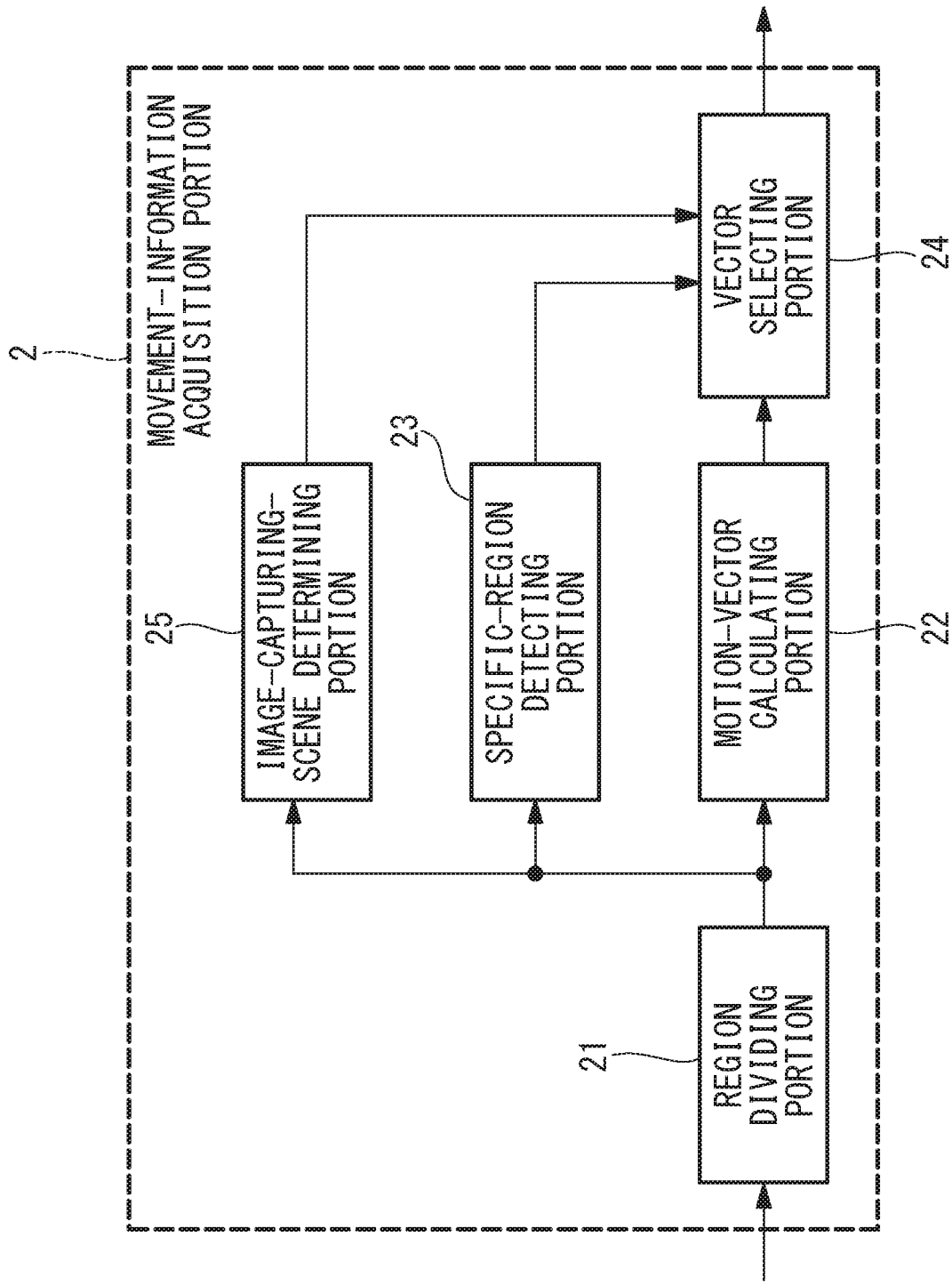
FIG. 13 is a block diagram showing a modification of the movement-information acquisition portion in FIG. 2.
Figure 14:
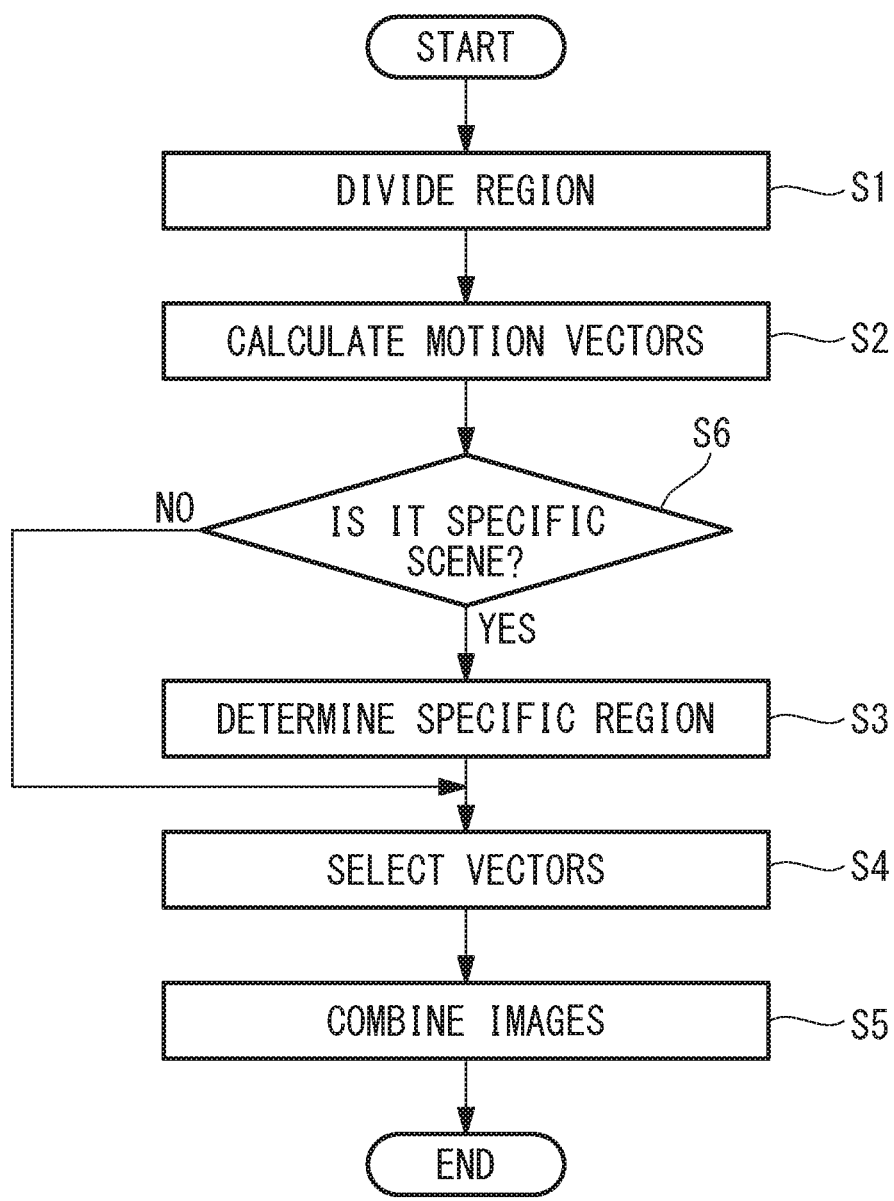
FIG. 14 is a diagram showing the flow of a modification of the image processing method in FIG. 8.

In addition, as shown in FIGS. 13 and 14, the movement-information acquisition portion 2 includes an image-capturing-scene determining portion (scene determining portion) 25 that determines image-capturing scenes from the acquired images, and whether or not the image-capturing scene is a specific scene, for example, a scene including the sky, is determined (scene determining step S6). In the case in which the image-capturing scene is the specific scene, the specific-region detecting portion 23 may perform determination of the specific regions A in which the high-luminance, low-contrast regions in the upper half of the image are detected as the specific regions A (specific-region determining step S3). Deep learning or another method may be employed in the specific scene determination. In addition, although the specific scene determination may be performed by using the standard image or the reference image, it is preferable to use the standard image so that the scene determination results do not change from one frame to another.

In addition, although a cloud has been described as an example of a high-luminance, low-contrast imaging subject, there is no limitation thereto, and a waterfall, a flame, smoke, fog, or the like may be used as the specific region A and may be excluded from the regions in which the motion vectors will be used.

As a result, the above-described embodiment leads to the following aspects.

An aspect of the present invention is directed to an image processing apparatus including: a region dividing portion that divides, regarding a plurality of images acquired by capturing images of an imaging subject over time, the respective images into a plurality of regions; a motion-vector calculating portion that calculates, for the respective regions divided by the region dividing portion, motion vectors by detecting movements of the imaging subject; a specific-region detecting portion that detects luminances and contrasts of the respective regions and that detects specific regions in which the detected luminances and contrasts satisfy determination conditions, the determination conditions being that the luminances are equal to or greater than a first threshold and that the contrasts are equal to or less than a second threshold; a vector selecting portion that selects the motion vectors to be used by excluding the motion vectors of the specific regions detected by the specific-region detecting portion from the motion vectors calculated by the motion-vector calculating portion; and a combining processing portion that generates a combined image by performing position alignment of the plurality of images by using the motion vectors selected by the vector selecting portion.

With this aspect, when the plurality of images acquired by capturing images of the imaging subject over time are input, the images are divided into the plurality of regions by the region dividing portion, and the motion vectors of the respective regions are calculated by the motion-vector calculating portion. In addition, the luminances and the contrasts of the respective regions are detected by the specific-region detecting portion, and thus, the specific regions in which the luminances and the contrasts satisfy the determination conditions are detected. Then, the motion vectors to be used are selected by the vector selecting portion by excluding the motion vectors of the specific regions from the calculated motion vectors, and a combined image is generated by the image processing portion by performing the position alignment of the plurality of images by using the selected motion vectors.

In this case, because the determination conditions in the specific-region detecting portion are that the luminance is equal to or greater than the first threshold and that the contrast is equal to or less than the second threshold, the motion vectors of high-luminance, low-contrast regions are excluded from the motion vectors for performing the position alignment. In other words, the motion vectors of cloud-like regions, which are not suitable for detecting position displacements, are appropriately excluded, and thus, it is possible to generate a combined image by performing the position alignment in a precise manner by reducing the number of artifacts due to the position alignment.

In the above-described aspect, the specific-region detecting portion may detect the specific regions by using the positions thereof in the images as a condition.

With this configuration, it is possible to detect the specific regions by using, as a condition, that the specific regions are disposed in specific positions in the images in addition to the determination conditions, which are having a high luminance and a low contrast. For example, in the case in which the cloud-like regions need to be excluded, it is possible to detect the specific regions in a more precise manner by using, as a condition, that the specific regions are positioned in the upper half of the images as a condition.

In the above-described aspect, the specific-region detecting portion may detect one of the regions as the specific region in the case in which other regions disposed so as to flank the one region have luminances and contrasts that satisfy the determination conditions.

With this configuration, it is possible to suppress the number of the specific regions in which the motion vectors are to be excluded to a minimum necessary number.

In the above-described aspect, the specific-region detecting portion may detect one of the regions as the specific region only in the case in which the number of the regions that satisfy the determination conditions is greater than the number of the regions that do not satisfy the determination conditions in a prescribed area centered on the one region.

With this configuration, it is possible to suppress the number of the specific regions in which the motion vectors are to be excluded to a minimum necessary number.

In the above-described aspect, the specific-region detecting portion may perform expansion processing on the regions that do not satisfy the determination conditions and may subsequently perform contraction processing thereon, thus re-determining whether or not the regions satisfy the determination conditions.

With this configuration, it is possible to suppress the number of the specific regions in which the motion vectors are to be excluded to a minimum necessary number.

In the above-described aspect may include a scene determining portion that determines an image-capturing scene by processing the images, wherein, in the case in which the image-capturing scene determined by the scene determining portion is a specific scene, the vector selecting portion may exclude the motion vectors of the specific regions.

With this configuration, it is possible to appropriately exclude the motion vectors of high-luminance, low-contrast regions in accordance with the image-capturing scene.

Another aspect of the present invention is directed to an image processing method including: dividing, regarding a plurality of images acquired by capturing images of an imaging subject over time, the respective images into a plurality of regions; calculating motion vectors by detecting, for the respective divided regions, movements of the imaging subject; detecting luminances and contrasts of the respective regions; detecting specific regions in which the detected luminances and contrasts satisfy determination conditions, the determination conditions being that the luminances are equal to or greater than a first threshold and that the contrasts are equal to or less than a second threshold; selecting the motion vectors to be used by excluding the motion vectors of the specific regions from the calculated motion vectors; and generating a combined image by performing position alignment of the plurality of images by using the selected motion vectors.

The present invention affords an advantage in that it is possible to generate a combined image in which position alignment has been performed in a precise manner by reducing the number of artifacts due to position alignment.

REFERENCE SIGNS LIST 1 image processing apparatus
3 combining processing portion
21 region dividing portion
22 motion-vector calculating portion
23 specific-region detecting portion
24 vector selecting portion
25 scene determining portion
A, A1, A2, A3 specific region

The invention claimed is:

1. An image processing apparatus comprising at least one processor comprising hardware, the at least one processor being configured to:
   divide, regarding a plurality of images acquired by capturing images of an imaging subject over time, each of the respective images into a plurality of regions, a size, shape, and layout of the divided regions being the same in all of the respective images;
   calculate, for each of the divided regions in all of the respective images, a motion vector by detecting movements of the imaging subject in the divided region;
   detect a luminance and a contrast of each of the divided regions, and detect specific regions among the divided regions whose detected luminances and contrasts satisfy determination conditions, the determination conditions including a condition that the luminances are equal to or greater than a first threshold and a condition that the contrasts are equal to or less than a second threshold;
   select motion vectors to be used by excluding motion vectors of the detected specific regions from the calculated motion vectors; and
   generate a combined image by performing position alignment of the plurality of images by using the selected motion vectors.

2. The image processing apparatus according to claim 1, wherein the detecting of the specific regions comprises detecting the specific regions by using positions thereof in their corresponding images as a condition.

3. The image processing apparatus according to claim 1, wherein the detecting of the specific regions comprises detecting one of the divided regions as a specific region in a case in which other divided regions disposed so as to flank the one of the divided regions have luminances and contrasts that satisfy the determination conditions.

4. The image processing apparatus according to claim 1, wherein the detecting of the specific regions comprises detecting one of the divided regions as a specific region only in a case in which a number of the divided regions that satisfy the determination conditions is greater than a number of the divided regions that do not satisfy the determination conditions in a prescribed area centered on the one of the divided regions.

5. The image processing apparatus according to claim 1, wherein the detecting of the specific regions comprises performing expansion processing on the divided regions that do not satisfy the determination conditions and subsequently performing contraction processing thereon, thus re-determining whether or not the divided regions having been subject to the expansion and contraction processing satisfy the determination conditions.

6. The image processing apparatus according to claim 1, wherein the at least one processor is further configured to determine an image-capturing scene by processing the images, and
wherein, in a case in which the determined image-capturing scene is a specific scene, the selecting of the motion vectors excludes the motion vectors of the detected specific regions.

7. An image processing method comprising:
dividing, regarding a plurality of images acquired by capturing images of an imaging subject over time, each of the respective images into a plurality of regions, a size, shape, and layout of the divided regions being the same in all of the respective images;
calculating, for each of the divided regions in all of the respective images, a motion vector by detecting movements of the imaging subject in the divided region;
detecting a luminance and a contrast of each of the divided regions;
detecting specific regions among the divided regions whose detected luminances and contrasts satisfy determination conditions, the determination conditions including a condition that the luminances are equal to or greater than a first threshold and a condition that the contrasts are equal to or less than a second threshold;
selecting motion vectors to be used by excluding motion vectors of the detected specific regions from the calculated motion vectors; and
generating a combined image by performing position alignment of the plurality of images by using the selected motion vectors.

* * * * *